United States Patent
Funge et al.

(10) Patent No.: US 7,296,007 B1
(45) Date of Patent: Nov. 13, 2007

(54) REAL TIME CONTEXT LEARNING BY SOFTWARE AGENTS

(75) Inventors: John Funge, Sunnyvale, CA (US); Ron Musick, Belmont, CA (US); Daniel Dobson, Atherton, CA (US); Nigel Duffy, San Francisco, CA (US); Michael McNally, Cupertino, CA (US); Xiaoyuan Tu, Sunnyvale, CA (US); Ian Wright, Mountain View, CA (US); Wei Yen, Los Altos Hills, CA (US); Brian Cabral, San Jose, CA (US)

(73) Assignee: AiLive, Inc., Mountain View, CA (US)

( * ) Notice: Subject to any disclaimer, the term of this patent is extended or adjusted under 35 U.S.C. 154(b) by 489 days.

(21) Appl. No.: 10/885,495

(22) Filed: Jul. 6, 2004

(51) Int. Cl.
*G06F 17/00* (2006.01)
*G06N 5/00* (2006.01)

(52) U.S. Cl. .................... 706/47; 434/350; 345/156; 706/45

(58) Field of Classification Search ............. 706/45, 706/47; 709/225; 715/706; 434/236, 350; 273/243; 345/156
See application file for complete search history.

(56) References Cited

U.S. PATENT DOCUMENTS

| | | | |
|---|---|---|---|
| 6,072,466 A * | 6/2000 | Shah et al. ............ | 345/156 |
| 6,201,948 B1 * | 3/2001 | Cook et al. ............ | 434/350 |
| 6,425,582 B1 * | 7/2002 | Rosi .................... | 273/243 |
| 6,427,063 B1 * | 7/2002 | Cook et al. ............ | 434/350 |
| 6,561,811 B2 * | 5/2003 | Rapoza et al. ........ | 434/236 |
| 6,892,349 B2 * | 5/2005 | Shizuka et al. ........ | 715/706 |
| 7,054,928 B2 * | 5/2006 | Segan et al. .......... | 709/225 |

FOREIGN PATENT DOCUMENTS

WO   WO 2006/014560 A2   2/2006

\* cited by examiner

*Primary Examiner*—Wilbert L Starks, Jr.
(74) *Attorney, Agent, or Firm*—Swernofsky Law Group PC (57) ABSTRACT

Providing dynamic learning for software agents in a simulation. Software agents with learners are capable of learning from examples. When a non-player character queries the learner, it can provide a next action similar to the player character. The game designer provides program code, from which compile-time steps determine a set of raw features. The code might identify a function (like computing distances). At compile-time steps, determining these raw features in response to a scripting language, so the designer can specify which code should be referenced. A set of derived features, responsive to the raw features, might be relatively simple, more complex, or determined in response to a learner. The set of such raw and derived features form a context for a learner. Learners might be responsive to (more basic) learners, to results of state machines, to calculated derived features, or to raw features. The learner includes a machine learning technique.

42 Claims, 3 Drawing Sheets

REAL TIME CONTEXT LEARNING BY SOFTWARE AGENTS

BACKGROUND OF THE INVENTION

1. Field of the Invention

The invention relates to context learning by software agents, such as for example might be used by embedded game agents in a gaming system, such as for example during play of the game.

2. Related Art

In a computer simulation, especially in a computer game that attempts to present a fantasy world (i.e., to create and simulate a variant world in which there are at least some fantasy or fictional aspects), there might be numerous agents within the game, each of which has independent actions they can perform. One set of those agents are controlled by players (herein sometimes called "player characters," and herein sometimes called "human users"), while other sets of those agents are controlled by the game software (herein sometimes called "non-player characters"). It is also possible that the selection of which of those agents are player characters and the selection of which of those agents are non-player characters might change from time to time as the game progresses, perhaps as the player chooses to control different characters.

One problem with such systems is that it is difficult to make non-player characters learn about the game in real-time (that is, as it is played) or in response to a exemplar such as a player character (that is, in response to choices made by a human user). There are several possible sources of potential learning, including for example, from current player characters, from records of play of player characters, from the non-player characters' own experiences, and from records of play of other non-player characters. It would be advantageous if non-player characters might become more like the player characters in their behavior, as this would lead to a richer and possibly more challenging game environment. For a first example, if player characters are imaginative, intelligent, realistic, or robust, it would be advantageous for non-player characters to exhibit at least some of these qualities, or to exhibit these qualities to at least some of the degree that player characters do. For a second example, if player characters exhibit one or more elements of oddity or quirkiness, it would be advantageous for non-player characters to exhibit at least some of those elements, or similar elements of oddity or quirkiness, or other aspects of the players' personality, as expressed through those players' playing style.

It would also be advantageous if non-player characters could learn in real time (that is, could modify their behavior and their response to various stimuli during actual play) from at least some of these possible sources of potential learning, including learning from player characters, from other non-player characters, or from their interaction with the game environment. More specifically, it would also be advantageous if each distinct player character can "teach" (for example, serve to model behavior for) its own set of non-player characters. Those sets of non-player characters might overlap, such as when the non-player characters learn the playing style of the player characters generally, or might be distinct, such as when the non-player characters are distributed into teams, each team of which learns the playing style of a specific player character during a specific time frame.

For a first example, if non-player characters could learn from a particular player character, that player might see their tactics and strategies, and possibly their personality, replicated and possibly amplified by a set of non-player characters (whether friendly non-player characters or enemy non-player characters). For a second example, if distinct teams of non-player characters could learn from multiple distinct player characters, those distinct player characters might each develop their own team of non-player characters, each team with its own particularized behavior and each team with its own leadership and cooperative strategies, in response to the ability or initiative of those player characters in training or re-training their respective teams.

In a first set of known systems, non-player characters have a set of pre-programmed behavior, which they follow no matter who the player is, how the player acts, or how the game progresses. (1) The set of possible actions can be pre-programmed by the game designer, with a known set of actions to be performed in known possible circumstances. This is sometimes called a "script." (2) More generally, a script might include random or pseudorandom selection of actions, in response to parameters selected by the game designer. (3) More generally, the parameters selected by the game designer can be adjusted to cause the global apparent behavior of the non-player character to change with time.

While these known methods generally achieve the goal of providing non-player characters with actions to take in each context expressed within the game, they have drawbacks. In general, the non-player characters do not learn, in real-time, to behave like a player character, and with the result that they typically remain less like player characters and with the effect that they typically remain less imaginative, intelligent, realistic, and robust than nearly all player characters. Lack of ability to learn has the effect that non-player characters are clearly inferior to, and do not share any salient characteristics of, the personality of any individual user.

In a second set of systems, known in some academic circles, a non-player character might maintain a model of how to behave (sometimes herein called a "character model of behavior" or a "behavior model"), and attempt to update that model in response to aspects of the game environment. (In this context, a "model" refers to a set of internal state indicative of information or techniques possibly learned by the non-player character; for example, if the non-player character were using a neural network to learn behavior, that model would include the connectivity and weights assigned to nodes and edges in that neural network, as well as the particular topology of that neural network, and methods of using the neural network to generate responses to queries.) For example, a non-player character might update that model in response to actions taken by a player character (for the purpose attempting to imitate that player character), or might update that model in response to experiences in the game environment (for the purpose of attempting to learn from its mistakes).

These known systems have two substantial drawbacks if they are to be used at run-time with known game systems: (1) they consume far too much in the way of computing and memory resources, in response to the very large number of possible contexts, and (2) models being learned in real-time are typically not sufficiently robust to be created and used in the course of actual game play.

A further drawback of known methods is that they generally involve substantial knowledge about both (1) machine learning techniques, and (2) sets of derived features likely to be valuable for machine learning, each of which has the effect, and in combination which have the effect, of involving substantial effort, time, and possibly monetary resources for the game designer to implement. It would be advantageous to provide a system in which non-player characters, or other actors, can learn from player characters, without requiring substantial investment of effort, money, or time by the game designer.

Accordingly, it would be advantageous to provide a method and system not subject to drawbacks of known systems.

SUMMARY OF THE INVENTION

The invention provides a method and system capable of providing dynamic learning for software agents in a simulation, such as for example non-player characters in a computer game. The method and system provide software agents with one or more learners, that is, software elements capable of learning from examples, capable of receiving requests from non-player characters and capable of responding to those requests with responses from which the non-player characters can readily derive one or more actions to take. In one embodiment, the learner gleans behavior from actions taken in context by a player character. This has the effect that when a non-player character queries that learner for a next action, the learner can provide a next action similar to one that might be taken by the player character (if the player character were directing the actions of that non-player character).

In one embodiment, the invention includes a method and system for adding a set of learners to the game structure, and a computer game with those learners added (that is, a method of playing a computer game, and a system for playing that computer game).

In one embodiment, the method and system include a set of derived features, responsive to raw features. Raw features include raw data that indicate information about a game environment, such as for example locations of game objects, distances between game objects, a direction of a most valuable visible object, measures of wounded status of player characters and non-player characters, measures of damage to non-living objects such as walls, and the like. Derived features might be relatively simply related to raw features, such as for example an indicator of a direction to move to get to a nearest enemy or treasure, or a measure of a distance thereto. Derived features might be more complex, such as for example (1) an expert system in which at least some state information is retained from time to time, or (2) a set of scripted instructions, or (3) a state machine operated in response to other raw features or derived features. Derived features might be still more complex, such as for example determined in response to a query to, and a response from, a learner. The set of such raw features and derived features, in combination, collectively form a context to which a learner is responsive. This has the effect that learners might be responsive to (more basic) learners, or to a set of results of (expert) state machines, or to a set of calculated derived features, or to a set of raw features, or to some combination or conjunction thereof.

In one embodiment, the learner includes one or more machine learning techniques, including for example, decision trees, hidden Markov models, Bayesian learning techniques, and other alternatives. Several machine learning techniques are known in the arts of artificial intelligence and machine learning. Among the many alternatives include techniques related to evolution strategies, genetic algorithms, genetic programming, multidimensional clustering, neural networks, and weighted majority techniques. In addition, the learner might include a weighted average of a set of relatively simpler elements, updated in real time during actual game play using an exponential gradient technique, or some other machine learning technique.

In one embodiment, there might be one or more learners associated with actions to be taken by selected software agents. For example, for a non-player character in a computer game, there might be separate learners for direction of movement and style of movement, and a separate learner for combat actions. Similarly, in a computer game in which such movement is possible, there might be a separate learner for direction of movement, and a separate learner for hopping, jumping, somersaulting, or otherwise indulging in acrobatics. Where appropriate, multiple actions might be separated into control by different learners, or where alternatively appropriate, multiple actions might be consolidated into control by one learner.

After reading this application, those skilled in the art would recognize that the systems described herein provide an enabling technology, with the effect that heretofore advantageous features can be provided that heretofore were substantially infeasible.

DETAILED DESCRIPTION OF THE PREFERRED EMBODIMENT

Preferred embodiments of the invention are described herein, including preferred device coupling, device functionality, and process steps. After reading this application, those skilled in the art would realize that embodiments of the invention might be implemented using a variety of other techniques not specifically described herein, without undue experimentation or further invention, and that such other techniques would be within the scope and spirit of the invention.

Definitions

The general meaning of each of these terms is intended to be illustrative and in no way limiting.

The phrase "game system" generally describes any computing device or other electronic system on which games might be played. Game systems include those units that are standalone consoles, portable devices, and general purpose computers capable of supporting game software (for example laptop and desktop computers). Known examples of standalone consoles include the Sony "PlayStation 2," the Nintendo "Game Cube," and the Microsoft "X-Box."

The phrase "computer game" or "game" generally describes software or instructions, or rules describing an interactive system, performed by a computing device or other electronic system and intended for use by a user. Computer games include character "fighting" games, hand-eye coordination or "shooter" games, mazes and puzzles, problem-solving games, racing or piloting games, role-playing games, simulation games, and other games. In the context of the invention, there is no particular requirement that computer games are designed to be played by children (games with adultoriented content are known), or that computer games are designed to be played for fun (games with educational intent are known), or that computer games have a "winning" or "losing" state (games with simulation effect, such as for example "Sim City 3000," are known). This concept is intended to broadly encompass any system in which a user interacts with a computing device, or with other users, according to rules (typically described and implemented by the software or instructions), even if those rules might be changed.

The phrases "game actors," "game agents," "software agents," and "game characters" (including both "player" characters and "non-player" characters) generally describe active software within the computer game, capable of making decisions (to anthropomorphize a bit) in response to contexts in which that active software responds. In the case of game characters, a player character would be primarily controlled by a user of the game (although there might be times when the game limits decisions for that character or imposes decisions on that character) and a non-player character would be primarily controlled by the game itself (although there might be times when the game allows a user to take all or partial control for that character).

The phrases "game environment," "game experiences," "game play," "game-state" or "state information," and "simulation" generally describe the state of the game system and the computer game, including the raw features, derived features, and contexts to which software agents respond.

The phrases "machine learning," "artificial intelligence," and the like interchangeably refer to processes and techniques by which computers or other devices emulate learning and learned behavior, for example to emulate or to predict actions of humans or other actors. (Technically, machine learning is a subset of artificial intelligence; however, the terms are generally used in a broader and more interchange sense in this application.)

The phrases "context," "actions taken in context," generally describe a set of features, which commonly taken together, indicate a state of the game system. A context can be generically thought of as a point (or a set of points, such as for example a cluster) selected from $R^n$, where n is the number of possible features and R represents the set of real numbers; that is, each context describes a set of possible values for all variables available in the game-state.

The phrase "decision model" generally describes any instructions, model, or technique for receiving queries and providing responses (in context). For one example, not intended to be limiting in any way, a decision model might include a technique for inference in a belief network.

The phrase "behavior model" generally describes any information or other representation for describing behavior (in context) of an exemplar actor. For one example, not intended to be limiting in any way, a behavior model might include a belief network.

The phrases "game designer" and "game software" generally describe, respectively, the entity providing the original game software and its concepts, and the original software capable of being compiled and executed as the game system or computer game.

The phrases "behavior modification," "dynamic learning," "learned behavior" (such as for example, responses to stimuli within the game environment), "learning," "learning by example," "learning from a model," "machine learning," and "real-time learning" generally describe alteration of parameters of a behavior model, with the effect that the software agent controlled by that behavior model exhibits different behavior in the future compared with the past. In one embodiment, dynamic learning is performed by non-player characters in response to exemplary actions performed by player characters.

The phrases "behavior strategies," "cooperation," "leadership," "modeling behavior," "training" and "retraining" generally describe types of exemplary behavior that might be presented, such as for example by a player character.

The phrases "player," or "user," generally describe a person (or a team of persons) controlling a player character.

The scope and spirit of the invention is not limited to any of these definitions, or to specific examples mentioned therein, but is intended to include the most general concepts embodied by these and other terms.

System Elements

Figure 1:
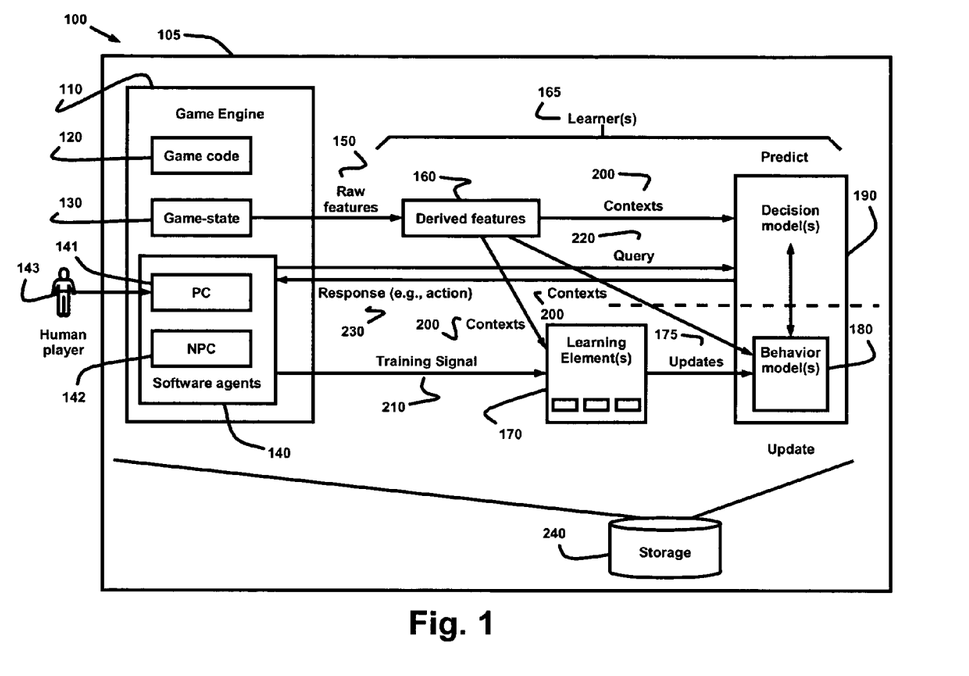
FIG. 1 shows a block diagram of a representation of a game system including context learning by software agents.

FIG. 1 shows a block diagram of a representation of a game system including context learning by software agents.

A game 100 on a game system 105 includes a game engine 110, which in turn includes game code 120, game-state 130, and one or more software agents 140.

The game code 120 includes a set of software processes for controlling the presentation of a computer game. Game code 120 typically is provided or coded by one or more game designers and programmers.

The game code preferably includes program structures such as data structures, data types, function entry points, function pointers, object data types, object methods, and the like. Some, all, none or different structure might be present depending on the way in which game 100 is designed.

Although the game code 120 is shown in FIG. 1 as a separate box, the other elements of the game engine 110 typically are formed from portions of game code 120.

The game-state 130 includes a set of state information, preferably used during operation of the game engine 110. Although the game-state 130 is shown in FIG. 1 as a separate box, the game-state can encompass variables and data structures used by the other element of the game engine 110.

The one or more software agents 140 collectively include one or more player characters 141 and non-player characters 142. Preferably, a player character 141 includes a video object controlled by a human user 143 (or a team of such human users 143). For one example, not intended to be limiting in any way, "Lara Croft" (of the "Tomb Raider" Series) and "Jak" (of the "Jak and Daxter" game) are examples of player characters 141. Preferably, a non-player character 142 includes a video object controlled by the system running the application software. For one example, not intended to be limiting in any way, the four roaming ghosts ("Blinky," "Pinky," "Inky," and "Clyde") in the classic "PacMan" game are examples of non-player characters 142. In some embodiments, it is possible to use game controllers or other input devices to affect the actions of at least some of the non-player characters 142, such as for example the second "Ice Climbers" character in "Super Smash Brothers Melee" (for the Nintendo GameCube).

The program code for the game engine 110 includes elements capable of specifying relevant information to other elements in the game 100.

For a first example, not intended to be limiting in any way, game engine 110 might include program structures having information relating to raw features 150.

The raw features 150 indicate important information about the game 100, such as for example a location of a game objects, a point value of a game object, a measure of a wounded status of a player character 141 or non-player character 142, and the like. In such cases, the program structures for raw features 150 might include C language code (or C++ language code, or code in another language) describing those data structures and how they can be referenced (such as for example a word offset within a data structure).

For a second example, not intended to be limiting in any way, game engine 110 might include references to object methods capable of computing raw features 150, such as for example a distance between game objects, a direction of the most valuable object visible, and the like. In such cases, the program structures for raw features 150 might include C language code (or C++ language code, or code in another language) describing locations of those object methods or instructions for performing them, and how they can be referenced (such as for example a function-call address).

For example, not intended to be limiting in any way, a raw feature 150 might include one or more of the following data:

A raw feature 150 might include a data structure, for example from game-state 130, used by the game; that is, used by the simulation to determine what happens in the context of the game 100. In one embodiment, the actual data structures used by the game are exposed to the learner 165, so that those data structures might be directly read from and written into, without any special requirement for a data marshalling step (or similar step) or a buffer (or similar data structure) in which data is maintained after reading from that data structure or before writing into that data structure. For one example, not intended to be limiting in any way, there might be a data structure "playerInfo" including fields for that particular player's position, velocity, allegiance, power, health, whether that player is a player character or a non-player character, and the like.

A raw feature 150 might include a list or an array of individual data structures, for example from game-state 130, used by the game; that is, used by the simulation to determine what happens in the context of the game 100. For one such example, not intended to be limiting in any way, there might be an array of data structures "playerInfo [ ]" including fields similar to those described above, and for a plurality of players, whether player characters or non-player characters. The structure of the raw feature 150 as a list or an array has an advantage in that related information can be determined about the game-state 130 for one or more functions serving as inputs to derived features 160 (described below) or to one or more learners 165 (described below). For one such example, not intended to be limiting in any way, an array of such data structures might allow determination of information about player-to-player relationships, such as for example (for each player) which other player is the nearest enemy or friend, and the like.

A raw feature 150 might include a list or an array of individual data structures, the individual data structures being similar to those described above, with the difference that the array relates to a set of objects other than players, such as an array of obstacles, an array of power-ups, and the like. For one such example, an array "nearestBlueTarget [ ]" might include an identifier, location or pointer to another character (either player character or non-player character) who is the nearest blue target.

A raw feature 150 might include a pointer to a descriptor or a function with the property of computing (or otherwise determining) a useful property of the game-state 130. For one example, not intended to be limiting in any way, a raw feature 150 might include a function "isVisible (p1, p2)", identified by a callback pointer or entry point, which provides a value describing whether player p2 is visible to player p1 (in response to game-state 130 such as for example whether player p2 has an invisibility cloak, player p1 is temporarily blinded, or can "see invisible," in addition to considerations of line-of-sight, and the like). While it is possible in many cases for a raw feature 150 of this type to be determined by the game engine 110 as a derived feature 160, it might be advantageous for the game designer to provide that descriptor or function as a raw feature 150, such as for example to take advantage of special knowledge of the game-state 130 or particular structure of the data structures used with that game-state 130.

As noted herein, there might be a very great many raw features 150, such as for example a location of a game objects, a point value of a game object, a measure of a wounded status of a player character 141 or non-player character 142, and the like.

The derived features 160 include a set of features derived in response to the raw features 150, such as for example by calculating the values of those derived features 160 using the values of the raw features 150. A derived feature 160 might include a weighted sum of a set of raw features 150, a function calculation in response to a set of raw features 150, and the like. For one example, not intended to be limiting in any way, a derived feature 160 might include a "best path" from a non-player character 142 to a target object, with the distance and direction for that best path pre-computed for each point thereon.

A derived feature 160 might be determined using one or more predefined calculations or operations performed on one or more raw features, raw features and derived features, or both raw features and derived 11 features. Some of the following examples are based on such pre-defined calculations or operations.

A derived feature 160 might also or instead be determined using one or more learned or derived calculations or operations performed on one or more raw features, raw features and derived features, or both raw features and derived features. Some of the following examples are based on such predefined calculations or operations.

For example, not intended to be limiting in any way, a derived feature 160 might include one or more of the following data:

A derived feature 160 might include a Boolean value or a predicate operator, such as a determination whether some condition is true at the moment with regard to the game 100. For one such example, not intended to be limiting in any way, there might be a predicate "p1→isHealthy" including a determination of whether a particular character p1 is considered healthy or not. In one embodiment, this particular derived feature 160 might be defined using the assignment "p1→isHealthy=IF(health>80% of maxPossibleHealth)", where "health" and "maxPossibleHealth" are raw features 150. Similar derived features 160 might be constructed for concepts such as "isFarAway," "isFriend," and "isEnemy."

A derived feature 160 might include a Boolean value or a predicate operator defined in response to already-known predicates. For one such example, not intended to be limiting in any way, there might be a predicate "p1→isHealthyFriend" defined using the assignment "p1→isHealthyFriend=IF(p1→isHealthy AND p1→isFriend)", where isHealthy and isFriend are themselves derived features 150.

A derived feature 160 might include an iterator defined in response to an array of already-known raw features 150 or derived features 160. For one such example, not intended to be limiting in any way, there might be an array playerInfo [ ]" as described above, including information relating to each player, and there might be an iterator "bluePlayerInfo [ ]" defined as the subset of all players in the array playerInfo [ ] also meeting the predicate operator isBlue. Similarly, using the iterator "bluePlayerInfo [ ]," another derived feature 160 such as "friendlyBluePlayerInfo [ ]" might be defined as the subset of all players in the array bluePlayerInfo [ ] also meeting the predicate operator isFriendly. Alternatively, the derived feature 160 such as "friendlyBluePlayerInfo [ ]" might be defined in response to only raw features 150 as the subset of the array playerInfo [ ] meeting the predicate operator (isBlue AND isFriendly).

A derived feature 160 might include an element of an iterative operator by selecting one or more objects from that iterative operator. For one such example, not intended to be limiting in any way, there might be an iterative operator "bluePlayerInfo [ ]" as described above, with a selector nearestOne applied thereto to select the nearest blue player. Similarly, if the iterative operator were named "enemyPlayerInfo [ ]" and defined using a predicate operator isEnemy, there might be applied thereto the same selector nearestOne to select the nearest enemy player.

A derived feature 160 might be defined in response to other raw features 150, other derived features 160, or recursively defined in response to a variant form of the same derived feature 160 (such as for example a sorted version of an array or list). For one example, not intended to be limiting in any way, there might be a predicate operator "safeAtLast" defined in response to either raw features 150 or derived features 160, as for example using the assignment "safeAtLast=IF (nearestEnemy==Null)".

A derived feature 160 might be defined in response to a learner 165, with the effect that an output of a defined learner 165 might be used as an input for defining a derived feature 160. For one example, not intended to be limiting in any way, a learner 165 might be defined to provide an array or list of the 10 choices recently made by a player character and the 10 choices predicted as most likely to be made by that player character for a "next move." In such cases, a derived feature 160 might easily be defined in response to that learner 165, such as for example using the assignment "surpriseMove=IF(actualMove!=predictedMove)".

One aspect of the invention is the provision of a selected set of derived features needed for the learner 165 to be able to learn effectively. The inventors have found that it is non-obvious and unexpectedly useful to provide such a selected set of derived features.

First, this has the effect of allowing the game designer to not have to think about which derived features are going to be derived from the raw features (or other system state variables) of the game simulation, when designing or implementing that game simulation.

Second, this has the effect of allowing the game designer to not have to design any code or data structures for providing those derived features, and also allowing the game designer to not have to design any code or data structures for computing those derived features.

Third, this has the effect of allowing the game designer to not have to think about any learning aspects of the game simulation, and not having to design any code or data structures therefore.

Fourth, this has the effect of allowing the game designer to call upon the learner 165 provided by the invention to ask for actions to be taken by non player characters (or any other game element that might learn, such as for example an intelligent device).

After reading this application, other and further advantages of providing a selected set of derived features will be clear to those skilled in the art. Moreover, these other and further advantages will be clear to be within the scope and spirit of the invention, and not to involve any undue experimentation or further invention.

Learner 165 is capable of providing dynamic learning for software agents in game 100. Learner 165 is capable of learning from examples, capable of receiving requests from non-player characters and capable of responding to those requests with responses from which the non-player characters can readily derive one or more actions to take. In one embodiment, the learner 165 gleans behavior from actions taken in context by a player character. This has the effect that when a non-player character queries that learner for a next action, the learner can provide a next action similar to one that might be taken by the player character (if the player character were directing the actions of that non-player character).

In one embodiment, learner 165 makes predictions and generates responses to queries for given contexts based on learned behavior. Learner 165 can also be referred to as a simulation engine.

In FIG. 1, learner 165 includes learning element(s) 170, behavior model(s) 180 and decision model(s) 190. The invention is not limited to learners constructed as shown in FIG. 1.

Inputs to leaning element(s) 170 include contexts 200 and training signal 210. Each context 200 includes a set of values for the derived features 160 and possibly for the raw features 150. The number of possible contexts might be quite large. For example, not intended to be limiting in any way, if there are several hundred raw features 150, each of which might take on one of ten possible values, and there are several hundred derived features 160 determined in response to those raw features 150, the number of possible contexts 170 might be larger than 10 raised to the power of hundreds.

Training signal 210 includes decisions made by one or more of software agents 140. Training signal 210 can also include comparisons between actions predicted by learner 165 and actions actually taken by a software agent. Thus, learning element(s) 170 are trained based on what decisions one or more software agents 140 make in various contexts.

In FIG. 1, learning element(s) 170 are the portions of learner 165 that are primarily responsible for generating signals that result in machine learning. In particular, learning element(s) 170 generate updates 175 for behavior model(s) 180.

A behavior model 180 attempts to model behaviors exhibited by software agents 140 in various contexts 200. Behavior model(s) 180 preferably generate predictions based on context information. The predictions from behavior model(s) 180 attempt to approximate what a player character or trained non-player character would do in the given context.

In one embodiment, a behavior model 180 includes a set of characteristics that (at least partially) predict the interaction of a non-player character 142 in various contexts during game-play. These characteristic could take the form of coefficients, weights, or other values In the arrangement shown in FIG. 1, the context information for behavior model(s) 180 is contexts 200 from derived features 160. Alternatively, the same or modified context information can be supplied to the behavior model(s) 180 from decision model(s) 190. For example, the decision model(s) could ask for a prediction about a context that might occur based on a current context but that is not actually occurring.

A decision model 190 uses one or more behavior model(s) 180 to respond to queries 220 from game engine 110, given contexts 200. Accordingly, a decision model 190 is responsive to a set of contexts 200, and is capable of providing a decision for an action by a non-player character 142. For example, a decision model 190 might provide a decision for a non-player character 142 regarding whether, in a particular context, fight or flight is better for that non-player character 142.

The decision model(s) 190 can be viewed as wrapping the behavior model(s) 180, in the sense that a decision model takes a prediction from one or more behavior model(s) and can choose to adapt or modify the prediction to answer a query. Alternatively, the decision model(s) and behavior model(s) can be viewed as separate entities, in the sense that the behavior model(s) are more involved in updating and learning, whereas the decision model(s) are more involved in predicting behavior and responding to queries.

The learner 165 embodies one or more machine learning techniques. Accordingly, the learner 165 would be ultimately responsive to the raw features 150 and derived features 160 in each of contexts 200, and thus responsive to each context 200 as it occurs, to provide a response to a query from the game engine 110.

Multiple learning elements 170, behavior models 180 and decision models 190 might be combined into one or more learners 165, each for responding to queries in different situations. These multiple learners, learning elements, and/or models might control distinct aspects of the actions taken by a non-player character 142 (in a particular context 170). For one example, not intended to be limiting in any way, a first learning element 180 might determine the fight-or-flight response (as described above) for the non-player character 142, a second learner 165 might determine what direction and how best to conduct flight when that response is chosen by the first learner 165, and a third learner 165 might determine how to conduct combat when that response is chosen by the first learner 165.

For example, not intended to be limiting in any way, a learner 165 might be responsive to include one or more of the following queries and provide one more of the following responses:

A query could be "what action should be taken next given a past, current, or predicted context." The action could be a direction vector to travel, a speed to travel, a discrete action choice (e.g. "punch", "shoot", "jump"), a force to apply, or any other action you can imagine a player character or NPC having to choose in a game.

The action could also be a "high-level" action that is translated down into game-level action by some other component. For example, not intended to be limiting in any way, the learner could respond with a goal location, a path planner then plans a path to the goal, and a path follower generates the low-level game actions to follow the path.

A query could be "what event is likely or possible to happen next" (such as for example, predicting a selected next event or a selected action by another character). The response could be an action that a player character or non-player character is likely take in a given context, a predicted change in context, or the like.

A query could be "what is a ranking for a set of possibilities." These possibilities could include possible player character or non-player character actions, possible current or future contexts, or the like. The rankings could be based on importance, likelihood of success, amount of time required, or the like, relative to some player character or non-player character goal or some game context.

A query could be for a sample from a distribution over a set of actual or possible results. In one embodiment, it is not necessary for the query maker to know the actual probability distribution to obtain a response.

A query could be "what is the probability, or conditional probability of a given event." In one embodiment, it is not necessary for the query maker to know the actual probability distribution to obtain a response.

A query could be "what is the probability distribution (in whole or in part) for a set of events." In one embodiment, it is not necessary for the query maker to know the actual probability distribution for each individual event to obtain a response.

A query could be "what is the location of similar objects within some set" given criteria by which the grouping is made.

A query could be "what are the top N most important factors in making a given decision," possibly with respect to a given phenomena, for example that explain the differences between 2 different answers to some other query.

A query could be "how certain or uncertain is the model about the query result being returned. In one embodiment, it is not necessary for the query maker to know how the query result is actually determined to obtain a response.

A query could be "what is the most critical information (input samples) that can be collected to reduce the uncertainty of a given query or class of queries." In one embodiment, it is not necessary for the query maker to know how the query result is actually determined to obtain a response.

A query could be "what is the most/least common result over a distribution of results." In one embodiment, it is not necessary for the query maker to know the actual probability distribution for each individual result, or how the query result is actually computed, to obtain a response.

A query could be "why was a given action predicted." In one embodiment, it is not necessary for the query maker to know the actual probability distribution for each individual predicted action.

A query could be "what actions should be taken" to achieve a given goal in a given context.

A query could be "what actions would one player or non-player character be likely to perform in place of another player or non-player character," as well as a listing or ranking of probabilities for those actions.

Other queries could include (from the perspective of a character) "what would I do if I were you," "what might I do in this other situation," "what are my top N choices," and the like.

As learner 165 is providing responses 230, the game engine 110 compares those responses with the actions of a target whose behavior the non-player character 142 seeks to imitate. For one example, not intended to be limiting in any way, the target might include a particular player character 141, with the effect that the decisions made by the learner 165 (as requested by the game engine 110) are compared with actual decisions made by the player character 141.

In the foregoing description of FIG. 1, learner 165 learns by having learning element(s) 170 update behavior model(s) 180, which in turn affect decision model(s) 190. The invention is not limited to this particular arrangement. Other designs of elements and modules that result in machine learning or other forms of artificial intelligence can be used with the invention. In those other designs, each of learning element(s) 170, behavior model(s) 180, and decision model (s) 190 might or might not be present, might have different responsibilities, or might be replaced with one or more other elements or modules.

Learning

A human player 143 generally makes better decisions the next time they encounter a situation based on the success of prior decisions and their outcomes. Simple Artificial Intelligence in computer games often does not learn because it generally retains no prior knowledge of past experiences, and when it does, it does not learn from that experience so as to act differently in that context a next time.

Enabling a game that learns to interact more like human beings keeps the game fresh for the human user 143. For example, "PacMan" was a very popular game in the early eighties. After publication of known "play patterns" for its non-player characters 142, anyone who knew the patterns could potentially score an unlimited number of points. Essentially, the game was beaten and gamers looked to other games that presented a challenge.

The learner 165 enables techniques whereby a game designer or programmer unskilled in artificial intelligence can take advantage of more powerful learning techniques, overcoming these short-falls of prior games that do not learn or that learn through simple AI techniques implemented by game designers and programmers.

In one embodiment, decisions made by the learner 165 (as requested by the game engine 110) are compared with actual decisions made by the player character 141. Training signal 210 can represent the actual decisions, a comparison of responses 230 to those decisions, or some other measure of actual decisions. Learning element 170 of learner 165 can use this training signal to update behavior model 180.

After reading this application, those of ordinary skill in the art would recognize that learner 165 can implement a predictive technique in which learner 165 attempts to predict the training signal 210 for each context 200. When the learner 165 is sufficiently good at predicting that training signal, it might be said that the learner 165 "learned to imitate" a target player character 141.

In one embodiment, the behavior model(s) 180 of learner 165 might use weighted averages, median calculations, or other statistical measures to make predictions. Learning element(s) 170 could update the coefficients or other values used to implement the statistical measures based on contexts 200 and training signal 210.

Preferably, the weights or coefficients for a behavior model 180 are real-valued coefficients or other values as precise as available using machine arithmetic. However, in the context of the invention, there is no particular requirement for selecting the coefficients or statistical measure from any particular number field.

The inventors have found that an exponential gradient technique for machine learning provides a reasonably quick, sufficient method by which the coefficients of learning element 170 can be updated.

Other techniques can be used by learner 165 instead of or in addition to the exponential gradient technique. Examples of such other techniques include but are not limited to a Bayesian classifier, a neural network, an expert system, a hidden Markov model, a partially observable Markov decision process model, etc.

After reading this application, those of ordinary skill in the art would recognize that many variations on the learner 165 are within the scope and spirit of the invention, and that those variations would not require undue experimentation or new invention. Some examples, not intended to be limiting in any way, include:

training an individual non-player character 142 in response to an individual target player character 141, such as for example to imitate that player character 141, to do the opposite of that player character 141, to act favorably toward that player character 141, to act inimically toward that player character 141, to act neither like nor dislike (that is, "orthogonal to") that player character 141, or in general any transformation of the above, such as for example to act like that player character 141 but more slowly;

training a group of non-player characters 142 in response to an individual target player character 141, such as for example to (imitate, do the opposite of, favor, disfavor, act orthogonally to, or some transform of the above) with regard to decisions made by that player character 141—this would include training a group of "followers" for that player character 141;

training one or more non-player characters 142 in response to a group of target player characters 141, where each decision or action made by an individual player character 141 might be considered in the training process, with the effect that one or more of the non-player characters 142 act in response to a statistical measure of the actions taken by those player characters 141 (for one such example, the training signal might be considered to be modal action taken by the set of individual player character 141 in that context, that is, whether most of them run away or stay to fight);

training one or more non-player characters 142 in response to a set of results (short-term, long-term, or otherwise) produced by a target, where that target might be one or more player characters 141, one or more non-player characters 142 (possibly including the ones being trained), or some combination thereof—this would include a technique for unsupervised learning by one or more non-player characters 142 in the game 100;

training one or more non-player characters 142 in response to an aggregate, average, or some other statistical sampling of actions taken by a group of player characters or non-player characters, for example to train the non-player characters based on a collective strategy used by a group of player or non-player characters (for one such example, the training signal for a first set of non-player characters might include the actions of a player character for a first time duration, while the training signal for a second set of non-player characters might include the actions of a player character for a second time duration, with the effect that the second set of non-player characters acts differently from the first set of non-player characters if the player character acted differently during the second time duration than during the first time duration);

training one or more subsets of non-player characters 142 at different times, with the effect that one or more non-player characters in a subset can later be designated to perform a certain action, to be used in a selected context, or the like, either by the game system or by a player;

retraining or repartitioning one or more subsets of non-player characters that were trained at different times.

In some embodiments, the game engine 110 might provide a human user 143 with access to attributes within a non-player character 142 generated by the learner 165, such as for example to correct any flaws, or such as for example to add flaws, such as when the non-player character 142 plays the game too well and is hard to beat.

In various embodiments, non-player characters 142 might start with any one of the following:

A blank slate behavior model 180—that is, no important information about the game 100;

a basic behavior model 180—that is, some basic information about the game 100, including possibly some rules to prevent the non-player character 142 from doing anything exceedingly stupid;

an advanced behavior model 180—that is, significant information about the game 100, possibly ranked by "experience" or "level" or some other measure of knowledge about the game 100.

In various embodiments, non-player characters 142 might be coupled to a training signal for learning, such as any one of the following:

no training signal a player character 141 as the training signal, such as for example to learn to imitate the knowledge and style of that player character 141;

reinforcement from the game 100 as the target, such as for example a form of unsupervised learning for the non-player character 142, as described above;

reinforcement from another non-player character 142 as the training signal, such as for example a set of "experienced" non-player characters 142 as described below—in such embodiments, non-player characters 142 might alternatively use each other as target training signals in a simulated contest among or between those non-player characters 142, providing a second form of unsupervised learning for the non-player characters 142.

In various embodiments, non-player characters 142 might be coupled to a learner 165 for learning, such as any one of the following:

no learning learning for an initial duration, after which the non-player character 142 has acquired some of the knowledge and style of the target, but not so much as to look like a copy thereof—the inventors have found that even a few seconds of regular play can bring a non-player character 142 to a point of looking very much like its target player character 141;

learning for a substantial duration, after which the non-player character 142 has acquired a substantial amount of the knowledge and style of the target, possibly enough to directly challenge the knowledge and style of that player character 141;

continual or periodic learning, in which the non-player character 142 continues to acquire more of the knowledge and style of the target.

A production run of a game 100 or application within the game 100 might include at least some non-player characters 142 for each degree of development in their behavior model 180.

In one embodiment, behavior models for the non-player character 142 might be saved for later use, either in the same game 100 or in another copy of that game 100 (that is, behavior models might be communicated or carried on physical media from one game 100 to another game 100). However, in the context of the invention, there is no particular requirement for actually saving any behavior models for any or all of the non-player characters 142.

Storage

The storage element 240 includes a device for storing electronic data including but not limited to a hard disk drive, an optical drive, a silicon chip storage element (smart media card, video game external storage card, random access memory). Code and data for the game 100 can be saved to the storage 240.

In one embodiment, data that is generated by the learner 165 might be saved and loaded, either on demand, or in response to particular inputs (such as for example a game controller button). This data might be used as an initial behavior model 180, that is, pre-training, or might be used as a static behavior model 180, that is, post-training. The behavior model 180 might be incorporated into one or more software agents 140, such as for example non-player characters 142. In some embodiments, new non-player characters might be generated with their initial behavior model 180 at least partially specified by the human player 143.

Applications

The invention enables a multitude of new modalities, mechanisms and options (collectively referred to as techniques below) for game designers. Examples, not intended to be limiting in any way, are described below. Application of the invention to these modalities, mechanisms and options would not require further invention or undue experimentation. These applications include techniques that support learning behavior either during actual game play, in a batch mode, or a combination thereof.

A technique that supports a "train by playing" modality whereby a player character's activities while playing the game is used to train non-player-characters. Entities such as followers (i.e., non-player characters) can learn not only the actions the player tends to take, but the contexts in which to apply them. Learning can continue over the course of the game.

A technique that supports creating teams wherein individual members of the team are trained individually by a player using the "train by playing" modality.

A technique that supports in-play controlling and/or influencing actions of other non-player-entities in a game. Entities include but are not limited to non-player-characters, and the active control elements of the virtual game world. Entities can be followers, friends or enemies.

A technique that supports controlling and/or influencing the actions of a group of followers that learn both the actions the player takes, as well as the context in which the player takes those actions in 2D and 3D tactical/strategic action and fighting games.

A technique that supports controlling and/or influencing entities that can recognize millions of different contexts and behave appropriately according to how they have observed the player behaving.

A technique that supports controlling and/or influencing entities that can adapt and evolve their behavior on-the-fly and over time as the player's behavior changes.

A technique that supports controlling and/or influencing entities that can learn tactical or high-level strategic play from the player.

A technique that supports controlling and/or influencing the actions of teammates in sports games. The sport maybe a depiction of a known sport, or a sport with rules concocted for the video game.

A technique that supports controlling and/or influencing entities that learn quickly and for whom learning can continue indefinitely.

A technique that supports controlling and/or influencing entities that can learn individual skills and/or how to co-operate in large and small groups.

A technique that supports controlling and/or influencing entities either during a single critical decision, or all the time, or anything in-between.

A technique that supports creating behavior for entities that can be saved, restored, replayed and/or traded.

A technique that supports personalizing a player's experience of the game.

A technique that supports controlling and/or influencing entities that can learn to make tactical decisions like, such as but not limited to: timing, spacing, approach, positioning and selection of opening moves and follow-up moves for attacks, blocks, and backing off; target selection, including double-teaming; direction and style of movement, where and when to dodge and flee; selection of a level of aggression; ordering and timing of decisions; deciding to flee or fight.

A technique that supports controlling and/or influencing target selection decisions, such as but not limited to: aiming for the heart of a cluster; aiming at stragglers; ignoring mobs and go for a leader or vice-versa; selecting which power-ups to go after, which crates to open, with what priority, and the like; selecting which rooms to in, which doors to try, and the like.

A technique that supports controlling and/or influencing entities that initially have either no knowledge, very little knowledge, lots of knowledge or anything in-between and learn from the player.

A technique that supports controlling and/or influencing a single companion, a core group of followers, whole armies, or anything in between.

A technique that supports controlling and/or influencing entities in single player mode, or in head-to-head events that show off training and leadership skills.

A technique that supports controlling and/or influencing entities whose errors can be corrected by demonstration.

A technique that supports controlling and/or influencing entities in different groups in different ways. That is, some user interface element, or pre-defined condition, is used to specify to which group the training signal is applied and when.

A technique that supports controlling and/or influencing entities whose behavior can evolve over multiple scenarios, and multiple games.

A technique that supports controlling and/or influencing entities at the formation level. For example, not intended to be limiting in any way, a group of entities can learn: What is the shape of a given squad—a line, a wedge, a square? When does a given squad choose to engage enemies, and when does it flee? Does every soldier attack for himself, or should he hold formation and coordinate attacks?

A technique that supports optionally controlling and/or influencing entities that can learn from the player with commands like: "Attention!," "Dismissed!," "Scatter!," or "Form up!"

A technique that supports creating non-player-entities that can explain their behavior.

A technique that supports creating non-player-entities that can negotiate.

A technique that supports sharing trained avatars (i.e., characters), for example to permit later selection of a best-trained avatar for each head-to-head encounter.

A technique that supports allowing a non-player character to emulate behavior of expert or even world-champion players.

A technique that supports training several generals at once on the battlefield, either by example or by swapping in to control them.

A technique that supports allowing a player to create avatars as opponents for other players to compete with.

A technique that supports creating and evolving a knowledge base per player, for example to be loaded up for competitive reasons.

Moreover, in the context of the invention, there is no particular requirement that the player themself cannot learn from non-player characters. For example the invention enables a technique that supports training a new player character by providing hints or indicators of what other player characters (or scripts designed for non-player characters would do in a similar context. Application of the invention to these techniques would not require further invention or undue experimentation.

Dead Reckoning

Another technique enabled by the invention includes "deal reckoning," in which a game (or other virtual simulation) might be performed on more than one computing device. For one example, not intended to be limiting in any way, a game might be played using two logically or physically remote computing devices A (including controlling a first player character X at computing device A) and B (including controlling a second player character Y at computing device B). Each computing device might use a prediction function predictLocation (character, futureTime) to predict a location of that selected character at that selected futureTime.

If each computing device has access to a substantially identical function predictLocation ( ), the computing devices might exchange only differences between actual values and predicted values. For one example, not intended to be limiting in any way, if computing device A predicts character X's future location at a time t1 as XA=predictLocation (X, t1), while computing device B predicts character X's future location at the time t1 as XB=predictLocation (X, t1), the two computing devices each know approximately where character X should be, that is, XA≈XB. If computing device A knows that character X is in a substantially different location, that is, computing device A's computation of XA−actualLocation(X, t1)>some minimum threshold tolerance, computing device A knows it needs to send information to computing device B to update the latter's value of actualLocation (X, t1).

In one embodiment, the predictor predictLocation ( ) can be improved by learning in context, either at computing device A, computing device B, or both. In such embodiments, computing devices A and B might need (but alternatively might dispense with) sending information to update each others' decision model for predictLocation ( ), but the inventors expect that total communication traffic between by computing devices A and B would be substantially reduced.

After reading this application, those skilled in the art would recognize that predictLocation ( ) has a clear training signal, as whenever it is wrong by more than some minimum threshold tolerance, it is corrected to provide the actual location value.

EXAMPLE

Figure 2:
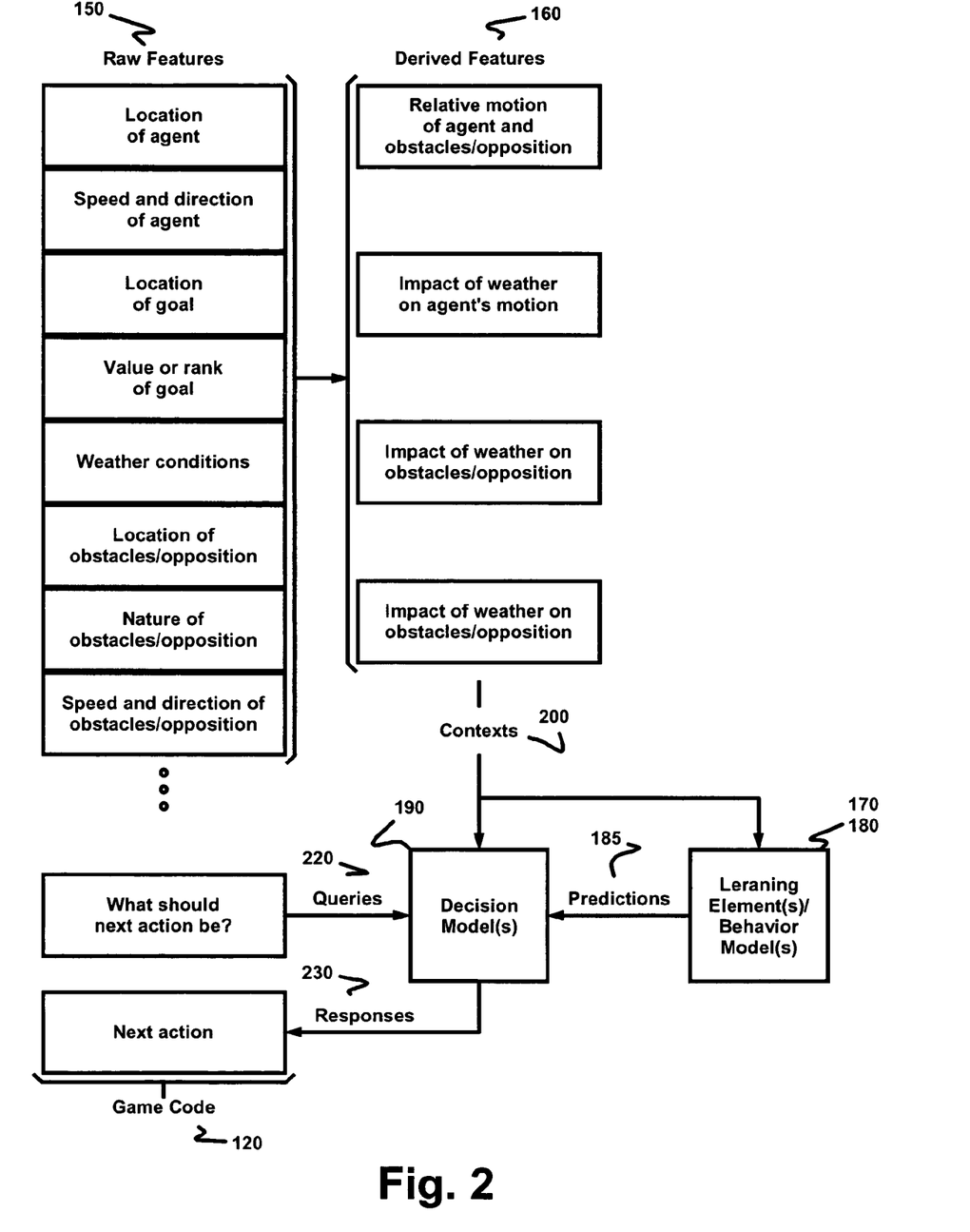
FIG. 2 shows a block diagram of an example of context learning by software agents.

FIG. 2 shows a block diagram of an example of context learning by software agents. The invention is not limited in any way to the details of this example.

Raw features 150 are shown in FIG. 2 as including various values and indications for game code 120. A learner according to the invention generates the derived features 160 from the raw features 150 and possibly from other derived features 160.

In the example shown in FIG. 2, the game code is for a simulator such as a flight simulator. The various raw features 150 relate to information about the flight simulation. The particular raw features shown in FIG. 2 are meant to be illustrative only; actual code for a flight simulator might use all, some, none, or different raw features.

The derived features 160 in FIG. 2 represent relationships between some of raw features 150. Derived features 160 according to the invention are not limited to such relationships. Furthermore, the particular relationships shown in FIG. 2 are meant to be illustrative only; actual derived features for a flight simulator might use all, some, none, or different derived features.

In order to generate the derived features, the learner must know where in the game code 120 to find those features. This information preferably is extracted from the code, preferably based on information supplied by the game's developer or designer, and based on templates supplied for this purpose.

The derived features 160 form one or more contexts 200. These contexts are supplied to learning element(s) 170 and behavior element(s) 180, where they are used to generate predictions 185.

The contexts also are supplied to decision model(s) 1909, where they are used in conjunction with predictions 185 to respond to queries 220 with responses 230. These queries and responses are used by game code 120 to incorporate the learning capabilities of the invention into the code.

The game code supplies training signals 210 to learning element(s) 170, which use the signals to update behavior element(s) 180. The behavior element(s) in turn affect the operation of decision model(s) 190.

Method of Operation

Figure 3:
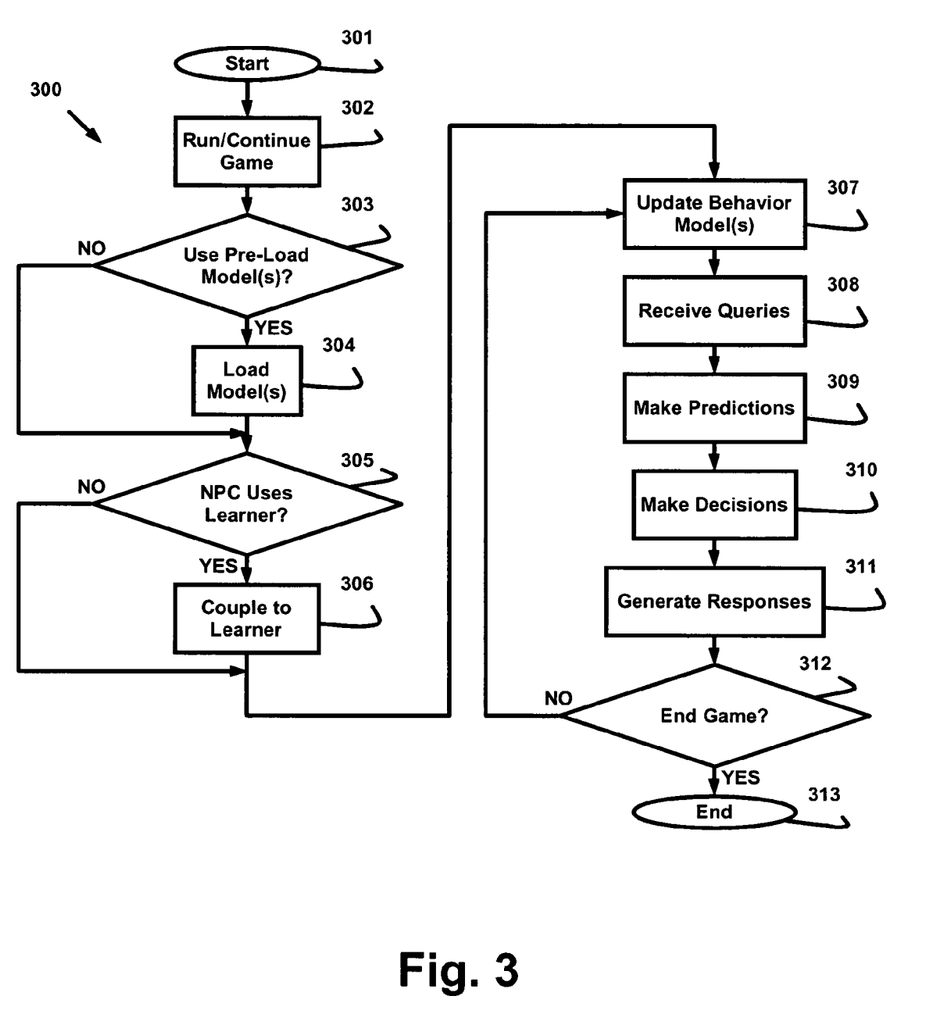
FIG. 3 shows a process flow diagram of a method of operating in a system for context learning by software agents.

FIG. 3 shows a process flow diagram of a method of operating in a system for context learning by software agents.

A method 300 is performed by the game 100. Although the method 300 is described serially, the flow points and steps of the method 300 can be performed by separate elements in conjunction or in parallel, whether asynchronously or synchronously, in a pipelined manner, or otherwise. There is no particular requirement that the method 300 must be performed in the same order in which this description lists flow points or steps, except where explicitly so indicated.

Associating, Updating and Using Behavior Models

At a flow point 301, the method 300 is ready to begin associating and updating behavior model(s) 180 with software agents 140.

At a step 302, the game 100 is activated, and the method 300 begins to operate in conjunction or combination with the game 100.

At a step 303, the method 300 determines if there should be any non-player characters 142 with pre-loaded behavioral and decision model(s). If so, the method 300 performs the next step (the step 304), and continues with the step thereafter (the step 305). If not, the method 300 skips the next step (the step 304), and continues with the step thereafter (the step 305).

At a step 304, the method 300 receives one or more behavioral models 180 and decision models 190 from the storage element 240, and incorporates or associates those models to non-player characters 142 as determined in the previous step (the step 303).

At a step 305, the method 300 determines if any non-player characters 142 (or other software agents 140) should be coupled to a learner 165 for learning. If so, the method performs the next step (the step 306), and continues with the step thereafter (the step 307). If not, the method 300 skips the next step (the step 306), and continues with the step thereafter (the step 307).

At a step 306, the method 300 couples one or more non-player characters 142 to learners 165, as determined in the previous step (the step 305).

At a step 307, the method 300 updates the behavior models 180, for example using learning elements 170 acting in response to contexts 200, which in turn are based on raw features 150 and derived features 160, and in response to training signal(s) 210.

In one embodiment, the contexts might include a set of changes from earlier recent contexts. However, in the context of the invention, there is no particular requirement for any special format for this information. Either all of contexts 200, or parts thereof, or a set of differences, or some of them, might be used.

In one embodiment, the training signals could be actions actually taken by a player or non-player character, a comparison of actions taken with earlier responses from leaner(s) 165 or predictions by behavior model(s) 180, or some other type of feedback. Learning elements 170 update behavior model(s) 180 responsive to these training signals, for example by updating coefficients, weights, or other values used by the behavior model(s).

At a step 308, the method 300 receives queries, for example for what action a non-player character should take, from one or more of the software agents 140.

At a step 309, the behavior model(s) 180 make predictions about what action a player character or some other character would take in the current context.

At a step 310, the decision model(s) 190 make decisions responsive to the predictions.

At a step 311, a response to the query is sent to the querying software agent responsive to the decisions.

In a training mode, less than all of these steps might be performed. For example, steps 310 and 311 might be skipped in a training mode. Conversely, if the learner(s) are considered to be fully trained, step 307 might be skipped. Other variations are possible.

Those of steps 307 to 311 that are performed preferably are repeatedly executed so as to facilitate learning by the software agents. As raw features 150 and derived features 160 change, contexts 200 change, permitting the agents to learn behaviors for different contexts. This continues until the game ends in steps 312 and 313.

Interrelation of Method Parts

After reading this application, those skilled in the art will recognize that many variations are possible that would be workable, that such variations are within the scope and sprit of the invention, and that such variations would not require undue experimentation or further invention.

For example, not intended to be limiting in any way, the following aspects of the method 300 would be clear to those skilled in the art:

Each of steps 307 to 311 can be, and preferably are, performed in parallel. This has the effect that the method 300 can update the learners 165 concurrently with using those learners 165 to make decisions on behalf of non-player characters 142.

In the context of the invention, there is no particular requirement for learning to start and stop when the game starts or stops. For example, learning might be conducted for only a short duration after the game starts, or at pre-selected time durations during the game, or at periodic time durations, or at time durations responsive to the game itself (such as for example, performing learning for combat skills only during intense combat).

In the context of the invention, it is possible for learning to be conducted in context at one or more levels of generality. For one example, not intended to be limiting in any way, non-player characters 142 can learn to imitate player characters' 142 skill at identifying the most dangerous enemy (e.g., not always the one that is hardest to defeat or does the most damage). Another example, also not intended to be limiting in any way, non-player characters 142 can learn to imitate player characters' 142 skill at determining when to initiate and when to break off combat (e.g., when health is too low for the remaining enemies, or when the remaining enemies appear too powerful to defeat without substantial risk). Another example, also not intended to be limiting in any way, non-player characters 142 can learn to imitate player characters' 142 degree of daring or risk-taking (e.g., whether particular risks are "too risky" or not). Another example, also not intended to be limiting in any way, non-player characters 142 can learn to imitate player characters' 142 goal preferences (e.g., whether to improve health or to find treasure to win the game, whether to prepare defensively against damage or offensively to defeat enemies, and the like). Another example, also not intended to be limiting in any way, non-player characters 142 can learn to imitate player character's 142 approach to goal-making or degree of intentionality of play (such as for example, whether to go out "looking for trouble," or to focus planning and effort on a specific enemy or prize). After reading this application, hose skilled in the art would recognize that all of these concepts are within the scope and spirit of the invention, would be workable, and would not require undue experimentation or further invention.

The more the game is played, the more experiential learning non-player characters 142 gain. This enhances overall game play and rewards the human user 143 for time invested in playing the game.

Most of the currently popular game consoles promote collaborative or competitive play. For example, the Sony PlayStation 2 console allows players to connect over a network to play as a team against other teams or to play against each other as enemies. Using the invention, a host of scenarios become possible. For example, but without limitation, a single human user can be a team that includes a player character 141 and one or more non-player characters 142.

In addition to collaborative or competitive games, there are also games representative of group activities, such as sports teams, corporate activity, or military units. For one example, not intended to be limiting in any way, a first possible use of the invention is for rapidly providing teams of non-player characters 142 with particular characteristics, such as for example a platoon of extremely loyal soldiers. For another example, again not intended to be limiting in any way, a second possible use of the invention is for providing teams of non-player characters 142 who imitate the player character 141 and thus allow the player character 141 to demonstrate (or learn) leadership. For another example, again not intended to be limiting in any way, a third possible use of the invention is for providing non-player characters 142 who rapidly learn the stratagems of the player character 141 and rapidly learn to neutralize simple tricks or quirks of the game 100.

Alternative Embodiments

Although preferred embodiments are disclosed herein, many variations are possible which remain within the concept, scope, and spirit of the invention. These variations would become clear to those skilled in the art after perusal of this application.

As noted above, the invention enables a multitude of new modalities, mechanisms and options (collectively referred to as techniques below) for game designers. Examples, not intended to be limiting in any way, are described below. Application of the invention to these modalities, mechanisms and options would not require further invention or undue experimentation.

For example, not intended to be limiting in any way, the invention supports techniques by which multiple non-player characters can learn from multiple player characters, for example by (a) designating one of the player characters as a target signal to be imitated by one or more non-player characters, (b) designating a statistical value in response to a set of player characters as a target signal to be imitated by one or more non-player characters.

For example, not intended to be limiting in any way, the invention supports providing generalized artificial intelligence or machine learning techniques that are responsive to an exemplar, such as for example by generating a model of desired behavior without explicitly programming that behavior.

After reading this application, those skilled in the art would recognize that the techniques described herein provide an enabling technology, with the effect that heretofore advantageous features can be provided that heretofore were substantially infeasible.

After reading this application, those skilled in the art will recognize that these alternative embodiments and variations are illustrative and are intended to be in no way limiting.

The invention claimed is:

1. A computer controlled system including
   a simulation engine having a set of state variables, and having a set of rules describing permitted changes in value of those state variables, wherein substantially each collection of possible values for the set of state variables defines a context;
   a stored set of behavior models, each capable of responding to a query from the simulation engine and capable of generating a response to that query;
   a stored set of software agents, at least one of which being responsive to one or more behavior models, said at least one being capable of being updated in response to actions taken in a context.

2. A system as in claim 1, wherein updating of said at least one of said set of software agents occurs in real time.

3. A system as in claim 1, wherein said state variables include at least one variable for a raw feature and at least one variable for a derived feature, wherein the derived feature is responsive to at least that raw feature.

4. A system as in claim 1, wherein said state variables include substantially all raw features and substantially all features responsive thereto.

5. A system as in claim 1, wherein updating of said at least one of said set of software agents occurs without reference to any external source logically remote from the simulation engine.

6. A system as in claim 1, including a set of features, each associated with a current context or with a set of information from outside the simulation engine.

7. A system as in either of claims 1 or 6, including
   a learner member capable of constructing at least one of said behavior models in response to an action taken by one or more of those software agents;
   whereby a first one of those software agents is capable of learning behavior in context from a second one of those software agents.

8. A system as in claim 7, wherein said software agents include at least one of: software agents for player characters, software agents for non-player characters.

9. A system as in claim 7, wherein the set of behavior models collectively includes at least one of:
   a Bayesian classifier;
   a neutral network;
   an expert system;
   an exponential gradient learner;
   an on-line learner;
in response to a plurality of features in a context.

10. A system in any of claims 1, 6 or 7, wherein the simulation engine includes at least one of:
   a self-learning mode including at least some of those behavior models and software agents having initial values, and reinforcing those behavior models and software agents which are successful according to an evaluator for the simulation engine;
   a demonstration mode including at least some of those behavior models and software agents demonstrating their learning to an observer;
   a real time mode including substantially all of those behavior models and software agents being updated with each change in context;
   a stochastic mode including introduction of random or pseudo-random values for at least some of those state variables.

11. A system as in any of claims 1, 6 or 7, wherein the simulation engine defines a computer game including at least one player or non-player character, and wherein the learning includes at least one of:
   a non-player character learning behavior from a player character;
   a plurality of non-player characters learning behavior from a player character;
   a plurality of non-layer characters learning behavior from a plurality of player characters;
   a plurality of non-player characters each learning behavior from a distinct one of a plurality of player characters;
   a first non-player character learning behavior from a second non-player character;
   a non-player character learning to produce similar behavior in context as another character;
   a non-player character learning to produce opposite behavior in context as another character;
   a non-player character learning to produce behavior in context friendly to another character;
   a non-player character learning to produce behavior in context inimical to another character.

12. A computer controlled system including
   a presentation member having a sequence of states, substantially each possible such state defining a context, the presentation including a stored set of software agents operative within a set of rules for the presentation; and
   a stored set of decision models, each capable of generating a response to a query for decision; wherein
   at least one of the software agents is responsive to one or more decision models, and is capable of being updated in response to changes from a first context to a second context.

13. A system as in claim 12, wherein said software agents include at least one of: software agents for player characters, software agents for non-player characters.

14. A system as in claim 12, wherein updating of said at least one of said set of software agents occurs in real time.

15. A system as in claim 12, wherein said context is responsive to at least one variable for a raw feature and at least one variable for a derived feature.

16. A system as in claim 12, wherein said context is responsive to substantially all raw features and substantially all features responsive thereto.

17. A system as in claim 12, wherein updating of said at least one of said set of software agents occurs without reference to any external source logically remote from the simulation engine.

18. A system as in claim 12, wherein
   each decision model is responsive to either a set of game features or a set of information derived therefrom;
   each decision model is capable of receiving queries from the computer game;
   each decision model is capable of generating a response to those queries; and
   each decision model is responsive to either statistical or logical representations of those game features or information derived therefrom.

19. A system as in claim 12, wherein
   the presentation member includes a simulation engine, wherein the sequence states in the presentation are represented at least in part by a set of state variables or by a set of information from outside the simulation engine, and wherein the set of rules for the presentation include at least in part a set of rules describing permitted changes in value of those state variables, wherein substantially each collection of possible values for the set of state variables defines a context; and the set of decision models is responsive to a set of behavior models, each capable of responding to a query from a simulation engine and capable of generating a response to that query.

20. A system as in claim 19, including a learner member capable of constructing at least one of said behavior models in response to an action taken by one or more of those software agents;

whereby a first one of those software agents is capable of learning behavior in context from a second one of those software agents.

21. A system as in any of claims 19 or 20, wherein the simulation engine includes at least one of:

a self-learning mode including at least some of those behavior models and software agents having initial values, and reinforcing those behavior models and software agents which are successful according to an evaluator for the simulation engine;

a demonstration mode including at least some of those behavior models and software agents demonstrating their learning to an observer;

a real-time mode including substantially all of those behavior models and software agents being updated with each change in context;

a stochastic mode including introduction of random or pseudo-random values for at least some of those state variables.

22. A system as in any of claims 19 or 20, wherein the simulation engine defines a computer game including at least one player or non-player character, and wherein the learning includes at least one of:

a non-player character learning behavior from a player character;

a plurality of non-player characters learning behavior from a player character;

a plurality of non-player characters learning behavior from a plurality of player characters;

a plurality of non-player characters each learning behavior from a distinct one of a plurality of player characters;

a first non-player character learning behavior from a second non-player character;

a non-player character learning to produce similar behavior in context as another character;

a non-player character learning to produce opposite behavior in context as another character;

a non-player character learning to produce behavior in context friendly to another character;

a non-player character learning to produce behavior in context inimical to another character.

23. system as in claim 12, 18 or 19, wherein said system has at least one decision model, the decision model being capable of generating a response to a query for decision, each decision model being responsive to either a set of game features or a set of information derived therefrom, and wherein at least one of the following is so:

each decision model is capable of being updated concurrently with operation of the computer game, whereby updates to the decision model occur while the player is using the computer game;

each decision model is capable of being updated without a history of earlier versions of that decision model;

each decision model is capable of being updated in response to a Bayesian statistical technique;

each decision model is capable of being updated in response to at least one of: an incremental induction technique, a classification technique, a clustering technique, an artificial intelligence technique, a machine learning technique, a statistical technique;

each decision model is capable of being updated in response to at least one of: a multiplicative update technique, a Winnow technique, a weighted majority technique, an exponential technique;

each decision model is capable of being updated in response to a graphical model including at least one of: a hidden Markov model, a Bayesian network model, a partially observable Markov decision process model, a neural network model.

24. A computer game as in claim 23, wherein updates occur substantially in real time while play of the computer game is ongoing.

25. In a computer controlled system including a simulation engine having a set of state variables, and wherein a collection of possible values for at least some of those state variables defines a context, a method including steps of defining a set of behavior models, each capable of receiving queries from the simulation engine and generating responses to those queries; and defining a set of software agents, each being responsive to one or more of those behavior models, and each capable of being updated in response to changes from a first context to a second context.

26. A method as in claim 25, including steps of presenting a sequence of states, substantially each possible such state defining a context, the steps presenting including operating a set of software agents within a set of rules for the steps of presenting; and generating a response to a query for decision by at least one of a set of decision models; wherein at least one of the software agents is responsive to one or more decision models, and is capable of being updated in response to changes from a first context to a second context.

27. A method as in claim 26, wherein the steps of presenting collectively include operating a simulation engine having a set of state variables, and having a set of rules describing permitted changes in value of those state variables, wherein substantially each collection of possible values for the set of state variables defines a context; and the set of decision models collectively include a set of behavior models, each capable of responding to a query from the simulation engine and capable of generating a response to that query.

28. A method as in either of claims 26 or 27, wherein the simulation engine includes a set of features, each either defined by a current context or associated with a set of information from outside the simulation engine.

29. A method as in either claims 26 or 27, including steps of constructing at least one of said behavior models in response to an action taken by one or more of those software agents; whereby a first one of those software agents is capable of learning behavior in context from a second one of those software agents.

30. A method as in either of claims 26 or 27, wherein the simulation engine includes at least one of:

a self-learning mode including at least some of those behavior models and software agents having initial values, and reinforcing those behavior models and software agents which are successful according to an evaluator for the simulation engine;

a demonstration mode including at least some of those behavior models and software agents demonstrating their learning to an observer;

a real time mode including substantially all of those behavior models and software agents being updated with each change in context;

a stochastic mode including introduction of random or pseudo-random values for at least some of those state variables.

31. A method as in either of claims 26 or 27, wherein the simulation engine defines a computer game including at least one player or non-player character, and wherein the learning includes at least one of:

a non-player character learning behavior from a player character;

a plurality of non-player characters learning behavior from a player character;

a plurality of non-player characters learning behavior from a plurality of player characters;

a plurality of non-player characters each learning behavior from a distinct one of a plurality of player characters;

a first non-player character learning behavior from a second non-player character;

a non-player character learning to produce similar behavior in context as another character;

a non-player character learning to produce opposite behavior in context as another character;

a non-player character learning to produce behavior in context friendly to another character;

a non-player character learning to produce behavior in context inimical to another character.

32. A method as in either of claims 26 or 27, including steps of in a computer game having at least one decision model, the decision model being capable of generating a response to a query for decision, generating a query for decision including at least one of:

selecting which action to take in a selected context, the selected context being a possibly empty context;

predicting a future event;

predicting what action another game agent will take in a selected context;

ranking a set of possibilities in an order according to a selected criterion;

selecting a result from a possible distribution thereof;

determining a probability distribution for a set of possible events;

determining a set of clusters of similar objects within a selected set;

providing a set of criteria by which determining a set of clusters of similar objects within a selected set can be performed;

selecting a set of relevant factors in making a game decision;

determining how certain or uncertain the decision model is regarding its response to a selected query for decision;

determining a set of relevant factors for retrieval to make the decision model more certain or less uncertain about its response to a selected query for decision;

determining a most common result from a possible distribution thereof;

determining a least common result from a possible distribution thereof;

providing an explanation of a reason for predicting a selected possible future action;

providing a sequence of actions to advance a game agent toward a selected goal.

33. A method as in either of claims 26 or 27, including steps of in a computer game having at least one decision model, the decision model being capable of generating a response to a query for decision, generating a response to a query for decision including at least one of:

training one or more non-player characters in real time in response to actual play by a human user of one or more player characters, whereby those one or more non-player characters learn during play;

training a group or team of non-player characters in response to an individual player character, whereby that group or team of non-player characters learn the knowledge or style of that player character during play;

training one or more non-player characters in response to decisions made by each of a plurality of player characters in context, whereby those one or more non-player characters act in response to a statistical measure of the actions taken by those player characters;

training one or more non-player characters in response to a set of game results, wherein those game results are produced by at least one of: one or more player characters, one or more non-player characters that are already trained, one or more non-player characters being trained.

34. A method as in either of claims 26 or 27, including steps of in a computer game having at least one decision model, the decision model being capable of generating a response to a query for decision, generating a response to a query for decision including training one or more non-player characters in response to one or more player characters, to perform at least one of:

imitating that player character;

doing an opposite of that player character;

act favorably toward that player character;

act unfavorable toward that player character;

act orthogonally to that player character;

act in a manner that is a particular transformation of how that player character acts.

35. A method as in either of claims 26 or 27, including steps of in a computer game having at least one decision model, the decision model being capable of generating a response to a query for decision, generating a response to a query for decision including training one or more non-player characters in response to a set of game results, wherein those game results are produced by at least one or more non-player characters that are already trained, one or more non-player characters being trained;

whereby no human user is required for training, whereby training of those one or more non-player characters is effectively unsupervised training.

36. A method as in either claims 26 or 27, including steps of in a computer game having at least one decision model, the decision model being capable of generating a response to a query for decision, generating a response to a query for decision including training one or more non-player characters in response to a set of game results, wherein those game results are produced by at least one of one or more non-player characters or at least one of one or more player characters;
whereby changes in strategy by a human user are adapted to by the one or more non-player characters in response to those changes, whereby those one or more non-player characters effectively learn from collaboration or competition with human users.

37. A method as in either of claims 26 or 27, including steps of
in a computer game having at least one decision model, the decision model being capable of generating a response to a query for decision, generating a response to a query for decision including training one or more non-player characters in response to a set of game results, wherein those game results are produced by at least on of one or more non-player characters or at least one of one or more player characters;
wherein group actions by those one or more non-player characters are responsive to the knowledge and style of at least one human user.

38. A method as in claim 37, wherein those group actions include at least one of: business actions, military actions, political actions, social actions, sports team actions.

39. A method as in either claims 26 or 27, including steps of
in a computer game having at least one decision model, the decision model being capable of generating a response to a query for decision, generating a response to a query for decision including training one of more non-player characters in response to a set of game results, wherein those game results are produced by at least one of one or more non-player characters or at least one of one or more player characters;
wherein actions by those one or more non-player characters are responsive for at least one human user, to at least one of: demographic information, player history, player preferences, player skill, player style.

40. A method as in claim 39, including at least two human users, wherein actions by those one or more non-player characters are responsive for at least one pair of human users, to a comparison or interaction between that at least one pair of human users, of at least one for each human user of: demographic information, player history, player preferences, player skill, player style.

41. A method as in either of claims 26 or 27, including steps of
in a computer game having at least one decision model, the decision model being capable of generating a response to a query for decision, generating a response to a query for decision including training one or more non-player characters in response to at least one of one or more non-player characters or at least one of one or more player characters;
wherein those trained one or more non-player characters are substantially able to negotiate with human users.

42. A method as in either of claims 26 or 27, including at least one of the following steps:
supporting train by playing, whereby activities by a player character while playing the game are used to train non-player characters;
supporting train by playing, whereby activities by a player character while playing the game are used to train non-player characters, whereby non-player characters can learn at least one of (1) actions a player character tends to take, (2) at least one context in which to apply those actions, (3) continuing learning over a time duration within the game;
supporting creating teams wherein individual members of the team are trained individually by a player using train by playing;
controlling or influencing actions of non-player-entities in a game, wherein those entities include at least one of non-player characters including followers, friends or enemies; or active control elements of the virtual game;
controlling or influencing the actions of a group of followers that learn at least one of (1) actions a player character takes, (2) at least one context in which to apply those actions are taken in 2D and 3D tactical/strategic action and fighting games;
controlling or influencing entities that recognize millions of different contexts and behave appropriate according to how they have observed the player behaving;
controlling or influencing entities that can adapt and evolve their behavior on-the-fly and over time as behavior of the player character changes;
controlling or influencing entities that can learn tactical or high-level strategic play from player characters;
controlling or influencing the actions of teammates in sports games, wherein the sport might be a depiction of a known sport, or a sport with rules conducted for the video game;
controlling or influencing entities that learn quickly and for whom learning can continue indefinitely;
controlling or influencing entities that can learn individual skills or how to cooperate in large or small groups;
controlling or influencing entities during any one of (1) a single critical decision, (2) all the time, (3) some fraction of decisions therebetween;
creating behavior for entities that can be saved, restored, replayed or traded;
controlling or influencing entities that can learn to make tactical decisions including at least one of: timing, spacing, approach, positioning and selection of opening moves and follow-up moves for attacks, blocks, and backing off; target selection, including double-teaming; direction and style of movement, where and when to dodge and flee; selection of a level of aggression; ordering and timing of decisions; deciding to flee or fight;
controlling or influencing target decisions including at least one of: aiming for the heart of a cluster; aiming at stragglers; ignoring mobs to attack a leader or vice-versa; selecting which power-ups to try to obtain, selecting which crates to open or with what priority; selecting which rooms to enter or with what priority, selecting which doors to try or with what priority;
controlling or influencing entities that initially at least one of (1) no knowledge, (2) very little knowledge; (3) lots of knowledge, or (4) some degree of knowledge therebetween, and thereafter learn from player characters;
controlling or influencing at least one of (1) a single companion, (2) a core group of followers, (3) whole armies, or (4) anything therebetween, in response to at least one player character;
controlling or influencing entities in a single player mode or in head-to-head events that show off training and leadership skills;
controlling or influencing entities whose errors can be corrected by demonstration;
controlling or influencing entities, wherein some user interface element, or pre-defined condition, specifies to which group the training signal is applied and when;
controlling or influencing entities whose behavior can evolve over multiple scenarios or multiple games;

controlling or influencing entities with regard to type of organization or formation, including at least one of: unit shape, when a unit chooses to engage enemies, when a unit chooses to flee enemies, whether a unit involves every soldier attacking individually or holding formation or coordinating attacks;

optionally controlling or influencing entities that can learn from the player character;

creating non-player entities that can explain their behavior;

creating non-player entities that can negotiate;

sharing trained characters, whereby later selection of a choice of avatars if possible for a selected encounter;

allowing a player to create avatars as opponents for other players to compete with;

allowing a non-player character to emulate behavior of an expert or a world-champion player character;

creating and evolving a knowledge base per player, wherein that knowledge base can be loaded for a selected encounter;

training a new player character by providing hints or indicators of what other play characters or scripts designed for non-player characters would do in a similar context.

\* \* \* \* \*